US005583497A

United States Patent [19]
Hankes

[11] Patent Number: 5,583,497
[45] Date of Patent: * Dec. 10, 1996

[54] ONE-HANDED DATA ENTRY TERMINAL AND METHOD OF USE

[76] Inventor: Elmer J. Hankes, 1768 Colfax Ave. S., Minneapolis, Minn. 55403

[*] Notice: The term of this patent shall not extend beyond the expiration date of Pat. No. 5,388,061.

[21] Appl. No.: 74,223

[22] Filed: Jun. 9, 1993

[51] Int. Cl.$^6$ ................................................ H03K 17/94
[52] U.S. Cl. .......................... 341/22; 341/27; 364/709.12
[58] Field of Search ................................ 341/20–23, 27; 345/168–169; 340/825.19; 364/708.1, 709.12; 400/472, 482, 483, 488, 489, 492, 494

[56] References Cited

U.S. PATENT DOCUMENTS

| D. 311,522 | 10/1990 | Knight | D14/106 |
|---|---|---|---|
| 3,967,273 | 6/1976 | Knowlton | 340/365 |
| 4,042,777 | 8/1977 | Bequaert et al. | 179/79 |
| 4,547,860 | 10/1993 | Lapeyre | 364/709 |
| 4,737,980 | 4/1988 | Curtin et al. | 379/97 |
| 4,752,772 | 6/1988 | Litt et al. | 345/168 |
| 4,833,446 | 3/1989 | Eilam et al. | 341/22 |
| 4,849,732 | 7/1989 | Dolenc | 341/20 |
| 4,891,777 | 1/1990 | Lapeyre | 364/706 |
| 4,917,516 | 4/1990 | Retter | 400/489 |
| 4,985,692 | 1/1991 | Breider et al. | 341/21 |
| 5,003,503 | 3/1991 | Lapeyre | 364/710.12 |
| 5,062,070 | 10/1991 | Lapeyre | 364/709.16 |
| 5,124,940 | 6/1992 | Lapeyre | 364/709.16 |
| 5,184,315 | 2/1993 | Lapeyre | 364/709.16 |
| 5,329,278 | 7/1994 | Dombroski | 341/20 |
| 5,388,061 | 2/1995 | Hankes | 364/708.1 |

OTHER PUBLICATIONS

"Compact Computer Keyboard," IBM Technical Disclosure Bulletin, vol. 27, No. 10 A, Mar. 1985, pp. 5640–5642.

Primary Examiner—Jeffrey Hofsass
Assistant Examiner—Andrew Hill
Attorney, Agent, or Firm—Moore & Hansen

[57] ABSTRACT

A data entry terminal for one-handed use, the terminal having a limited number of keys, all of which may be reached by a single hand of the user from a home position that does not require the keyboard operator to reposition their hand when moving from one key to another. The keyboard preferably includes a heel rest on which the heel of the hand may be pivotably positioned for comfortable, reliable positioning while operating the keyboard, requiring a minimum amount of eye contact with the keyboard, permitting the keyboard operator to maintain eye contact with the source of data being entered into the computer or other data gathering device. The terminal is preferably bent in two places, with a row of keys on each of the two resulting generally upwardly angled surfaces and three rows of keys on the flat intermediate surface connecting the two angled surfaces. Additionally, the keys are arranged in four columns, the first three of which are spaced a predetermined distance apart, and the fourth of which is spaced a slightly greater distance from the rest. It is also preferred that the middle row of keys include a generally outwardly projecting, generally bisecting ridge that is detectable by the keyboard operator without distracting the operator from the data entry task. Successful operation of the keyboard preferably requires two keystrokes for each alphanumeric character being entered into the data collection device by the data entry terminal.

37 Claims, 3 Drawing Sheets

ONE-HANDED DATA ENTRY TERMINAL AND METHOD OF USE

BACKGROUND OF THE INVENTION

1. Technical Field

The present invention relates generally to data entry terminals, such as computer keyboards, that permit the entry of a full range of alphanumeric characters into a data collection device, such as a computer, with the use of only one hand. More specifically, the keyboard relies on a limited number of keys to accomplish the task, and requires two keystrokes for nearly every data entry command or character entered on the terminal.

2. Background Information

Data entry terminals, including computer keyboards, are presently available in a variety of styles, although the most prevalent is the so-called QWERTY keyboard. The QWERTY keyboard is based on the traditional typewriter keyboard that has been in use for decades, with the addition of certain function keys, including keys for a numeric keypad and cursor control keys. QWERTY keyboards, however, have at least two major disadvantages: First, they take up a great deal of space. Modern portable computers often include reduced size QWERTY keyboards, but these are frequently much more difficult to use than full-sized keyboards because the keys themselves are also made smaller and are frequently moved closer together.

A second major disadvantage is that all traditional QWERTY keyboards require the use of both hands for efficient operation. Since these keyboards may have up to 128 keys or more, and since the keyboard is relatively large in comparison to the size of the human hand, typists are always trained to use both hands to achieve the speediest, most efficient use of the keyboard.

As noted above, other forms of keyboards and data entry terminals have become available in recent years as considerations of ergonomics and space efficiency become important. However, few if any such keyboards offer efficient one-handed operation and offer the operator physical cues to permit the operator easily to operate the keyboard without watching it while entering data.

It is well known in the art to provide certain of the keys with raised portions to indicate to the typist where the "home" position is on the keyboard. On the traditional QWERTY keyboard, for example, the F and J keys may include a small projecting dot that is just large enough to be detected by the operator's fingers without interfering with the operation of the keyboard. Additional projecting dots may be provided on other keys, such as the 5 key on a numeric keypad. Additionally, the function keys or a numeric keypad may be spaced a slight distance from the other keys of the keyboard, permitting the experienced typist to detect on which portion of the keyboard their hand is positioned. However, given the great number of keys necessary to input a full range of alphanumeric characters and to activate other functions provided by modern software programs available on today's computers, it is necessary for the typist to move both of their hands to reach all of the keys. In the process of moving the entire hand, it is more difficult for all but the most experienced typists to return to the home position without first searching for the keys with the projecting dots. Most typists are forced to take their eyes from their work and look toward the keyboard in order to return to the home position.

Additionally, certain data entry tasks are most easily performed with only one hand, perhaps because of the nature of the work or the location of the operator. For example, in certain inventory-taking environments, an operator may be required to hold a box or container in a certain position with one hand while entering data with the other. Or an operator may be required to enter data from an awkward position that requires the use of one hand to maintain proper balance or position while entering data with the other. Also, many physically disabled people with only one hand available for typing may find it at best inefficient, and at worst nearly impossible, to enter data on a traditional keyboard, since they may be required to reposition their typing hand with each individual keystroke.

The one-handed data entry terminal of the present invention overcomes difficulties described above and affords other features and advantages heretofore not available.

SUMMARY OF THE INVENTION

The invention includes a bent keyboard having three flat surfaces, the two outer ones of which are angled away from the third, intermediate surface on the same side of the plane defined by the intermediate surface. The keyboard preferably includes five rows and four columns of keys. One row is positioned on each of the two angled surfaces, with the three remaining rows located on the third, intermediate surface.

Preferably positioned on and integral with the angled surface nearest the keyboard operator is a surface on which may be rested the palm of the hand of the keyboard operator. The shape of the keyboard permits the keyboard operator to position their hand resting on this surface and have all keys of the keyboard within reach without having to reposition their entire hand, as is required of other keyboards currently available.

The entry of any alphanumeric character or the activation of a program function is accomplished by two keystrokes. Each pair of keystrokes is associated with a unique keyboard function, such as an alphanumeric character, hard return, etc. A possible method for the entry of data using two keystrokes per character, is disclosed and claimed in the applicant's copending application Ser. No. 08/051,480. When using the keyboard, the operator may rely on one of several physical cues to determine where any particular finger is positioned with respect to the keys on the keyboard, and thus determine where to move their fingers without having to turn their head and look at the keyboard, thereby looking away from the source of data being entered via the keyboard.

These physical cues are of three types. First, the middle row of keys preferably includes a raised, horizontal, bisecting ridge extending across the face of the key. This ridge, while being large enough to be detected by the fingertip of the keyboard operator, is small enough not to interfere with the normal operation of the keyboard. When the operator feels this raised ridge, they know that their finger is touching a key on the middle row of keys. A second cue is provided in the spacing of the keys, one from another. In the preferred embodiment, the three leftmost columns of keys each have equal spacing one from the next. The fourth column, however, is a slightly greater distance from the third, providing another indication to the operator of where the fingertip is with regard to the keys on the keyboard.

The final sets of cues come from the arrangement of the first, or bottom, and fifth, or top, rows of keys, which are positioned on the lower and upper angled surfaces, respectively. All of the keys preferably include flat surfaces generally parallel with the surface of the portion of the keyboard on which they are positioned, so that if the operator's fingertip touches a key with an angled surface, the key is positioned on an angled surface of the keyboard itself. Similarly, if the operator's fingertip touches a key with a generally horizontal surface, the key is positioned on the horizontal, intermediate portion of the keyboard.

Optionally available with the data entry device is a cushion attached to the portion of the keyboard on which the operator's hand rests. The cushion may include a cavity where the carpal tunnel of the operator would be located in order to avoid applying pressure to the carpal tunnel.

Other objects and advantages of the invention will become apparent from the following detailed description and from the appended drawings in which like numbers have been used to describe like parts throughout the several views.

DESCRIPTION OF THE PREFERRED EMBODIMENT

Figure 1:
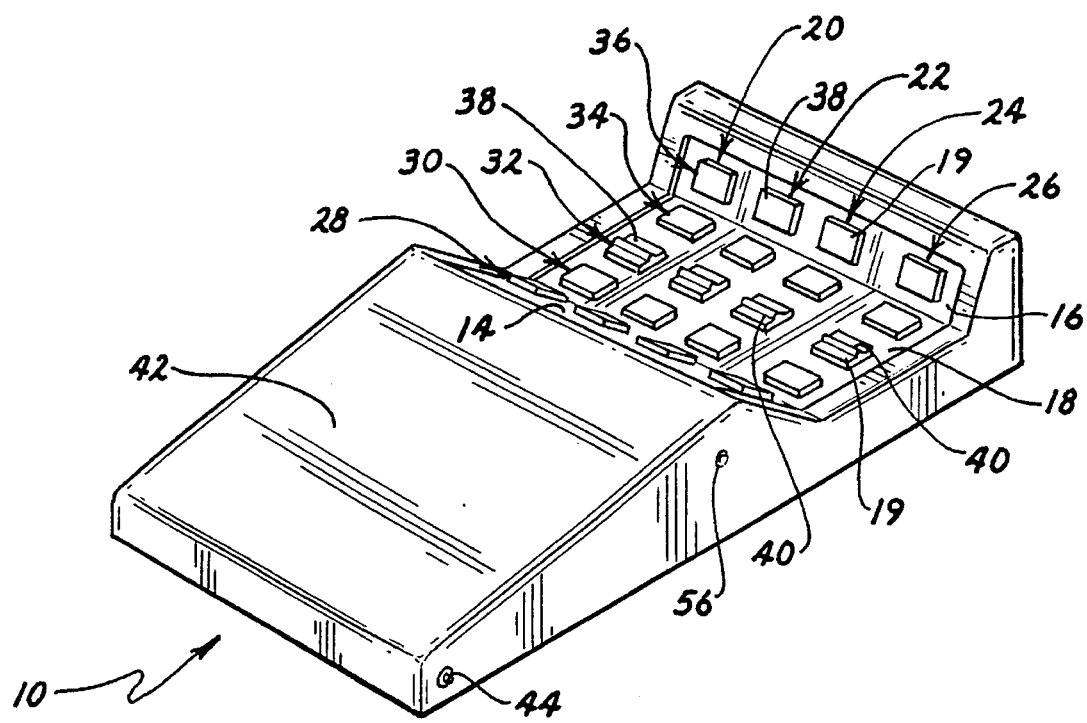
FIG. 1 is a perspective view of the preferred embodiment of the present invention.

With reference to the drawings, and in particular to FIG. 1, the one-handed data entry terminal is generally indicated by reference numeral 10. As may be seen, data entry terminal 10 includes a keypad portion 12 having a first obtuse, generally upwardly angled segment 14, a second obtuse, generally upwardly angled segment 16, and an intermediate segment 18. Preferably, data entry terminal 10 is connected to a data gathering device, such as the central processing unit (CPU) of a personal computer, by a cable (not shown), although data may be transmitted to the data gathering device by infrared signal or other cordless data transmitting means.

All three surfaces of the keypad portion 12 are flat. Keypad portion 12 preferably includes twenty keys 19, arranged in four columns 20, 22, 24 and 26, respectively, and five rows 28, 30, 32, 34 and 36, respectively. Columns 20, 22 and 24 are preferably spaced an equal distance apart one from another, while column 26 is preferably spaced a distance somewhat greater from column 24. The distance between column 24 and column 26 should be large enough to be detectable to the touch of a keyboard operator. As illustrated in the several figures, numerals and other symbols are preferably positioned on keypad portion 12 adjacent to keys 19. If preferred, however, the symbols could also be positioned on the keys themselves.

As shown in FIG. 1, row 28 is positioned on first angled segment 14 of keypad portion 12. Rows 30, 32 and 34 are positioned on intermediate segment 18, and row 36 is positioned on second angled segment 16.

The upper, exposed surface 38 of each key 19 is preferably flat and generally parallel with the respective keypad segment on which it is positioned. However, each of the keys 19 of row 32 preferably additionally include a raised, horizontally extending, generally bisecting ridge 40. This upwardly projecting ridge 40 should be of great enough elevation to be detectable to the touch of a keyboard operator without interfering with the normal operation of data entry terminal 10.

Figure 6:
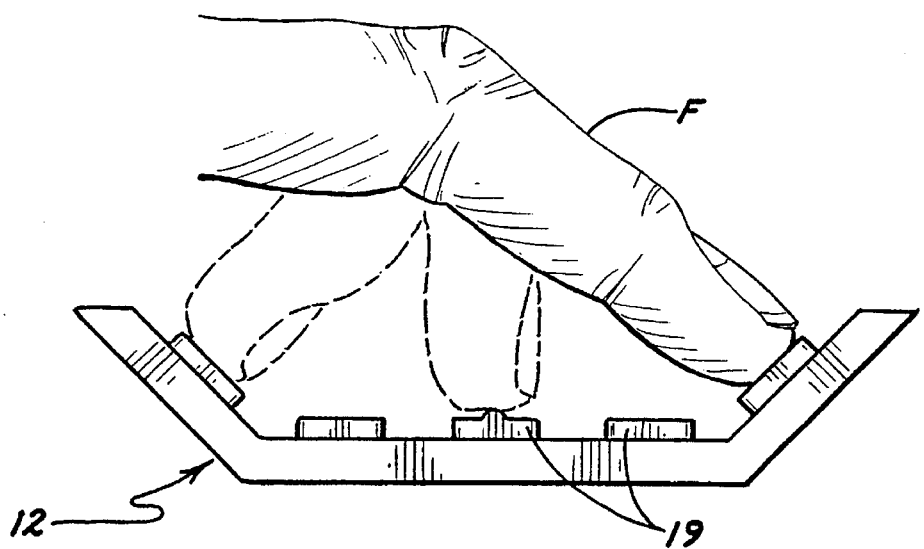
FIG. 6 is a side view of the keypad portion of the preferred embodiment during actual use.

Also included on data entry terminal 10 is a resting portion 42 on which the heel of the palm of the hand of the keyboard operator may be positioned. In the preferred embodiment, the resting portion 42 slopes somewhat downward and away from first angled segment 14 of keypad portion 12. Resting portion 42 permits the keyboard operator to position their hand in such a way that all of the keys 19 of the keypad portion 12 may be reached by the fingers F of the keyboard operator, as illustrated in FIG. 6. Resting portion 42 also provides a relatively large surface on which, among other things, a chart (not shown) may be positioned indicating the various keystroke combinations that result in the entry of appropriate commands into the data collecting device to which data entry terminal 10 is attached.

Figure 5:
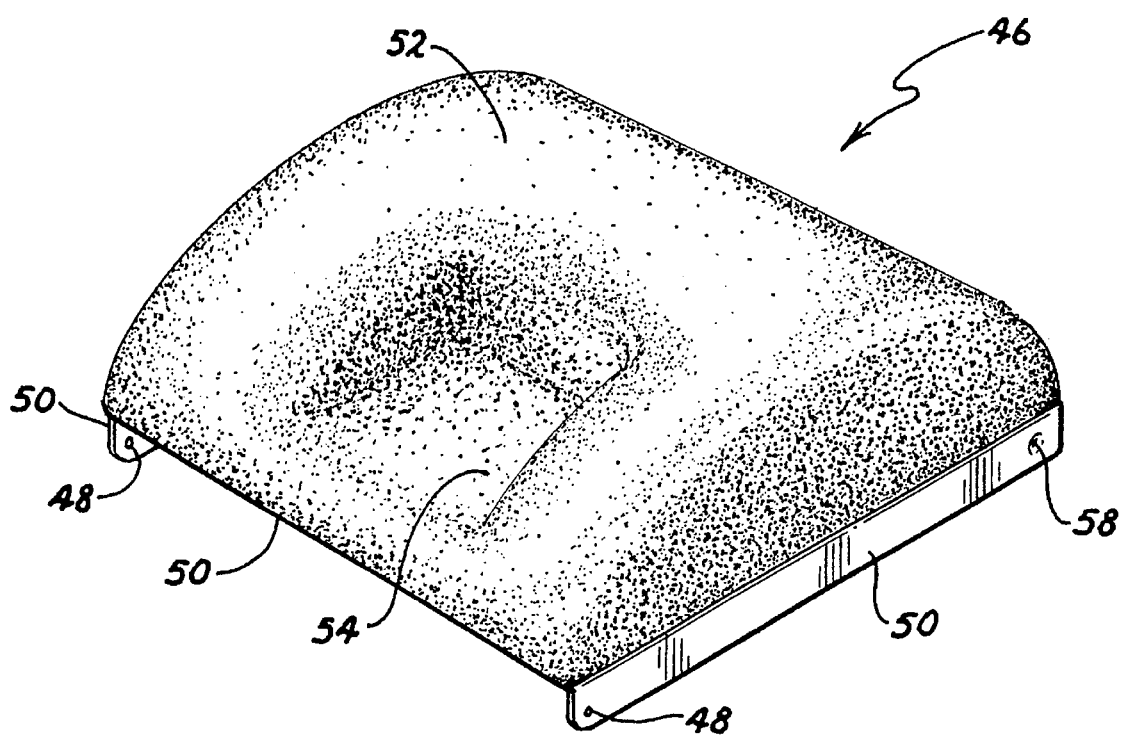
FIG. 5 is a perspective view of the preferred embodiment of the optional wrist rest of the present invention.

In the preferred embodiment, a palm cushion assembly 46, illustrated in FIG. 5, may also be positioned overlying resting portion 42. To secure palm cushion assembly 46 in position, there are projecting from both sides of data entry terminal 10 opposably positioned retaining pins 44 that cooperate with holes 48 on support plate 50 of palm cushion assembly 46. When installed, palm cushion assembly 46 pivots about the axis formed by retaining pins 44, which are inserted through holes 48. Thus, although palm cushion assembly 46 covers any chart that may be positioned on resting portion 42, palm cushion assembly 46 may be pivoted upward to permit easy reference to such a chart. It is preferred that palm cushion assembly be spring loaded to permit it to be biased generally downwardly into the normal use position, secure against resting portion 42. Palm cushion assembly 46 further includes a pad 52 that includes a deep relief 54 in the middle bottom edge. Relief 54 prevents pressure on the carpal tunnel area of the keyboard operator. As illustrated in FIG. 1, an inwardly projecting dimple 56 may also be provided on one or both sides of data entry terminal 10 to cooperate with an inwardly projecting detent 58 on support plate 50 of palm cushion assembly 46 to secure it in its normal use position.

Figure 3:
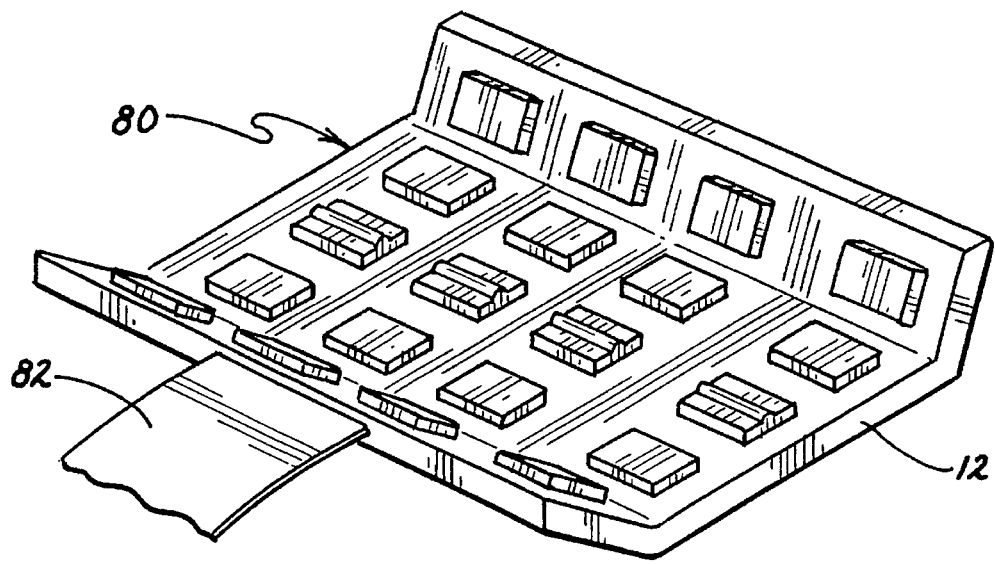
FIG. 3 is a perspective view of another alternate embodiment of the present invention.

Data entry terminal 80, illustrated in FIG. 3, is an alternate embodiment that incorporates keypad portion 12 of data entry terminal 10, but communicates with the data gathering device via a ribbon connector 82. Data entry terminal 80 may, however, be integrated directly into a data gathering device, such as the housing of a portable personal computer.

Figure 2:
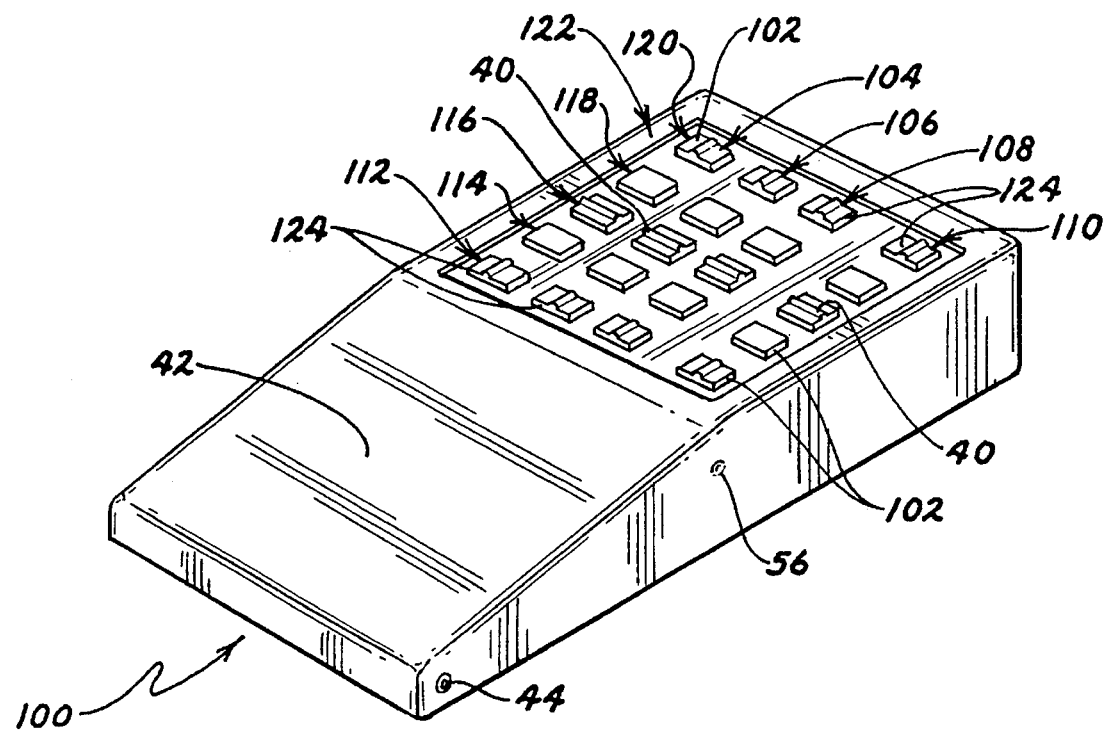
FIG. 2 is a perspective view of an alternate embodiment of the present invention.

Data entry terminal 100, illustrated in FIG. 2, is similar in most respects to data entry terminal 10, with the major exception of the bent configuration of keypad portion 12. Data entry terminal 100 also includes twenty keys 102 positioned in four columns 104, 106, 108 and 110, respectively, and five rows 112, 114, 116, 118 and 120, respectively. However, the keypad portion 122 of data entry terminal 100 is flat and includes no angled segments. Thus, all four rows and five columns of keypad portion 122 lie in the same plane. As with data entry terminal 10, columns 104, 106 and 108 of data entry terminal 100 are preferably spaced an equal distance apart one from another, while column 110 is preferably spaced a distance somewhat greater from column 108. The distance between column 108 and 110 should be large enough to be detectable to the touch of a keyboard operator.

Keys 102 of row 116 of keypad portion 122 are identical to those of row 32 of data entry terminal 10 in that they include a raised, horizontally extending, generally bisecting ridge 40. However, since keypad portion 122 of data entry terminal 100 lacks the angled segments of keypad portion 12 of data entry terminal 10, each of the keys 102 of rows 112 and 120 preferably additionally include a raised, vertically extending, generally bisecting ridge 124. The upwardly projecting ridge 124 should be of great enough elevation to be detectable to the touch of a keyboard operator without interfering with the normal operation of data entry terminal 100. Ridges 124 provide the keyboard operator with physical cues to indicate the location of the operator's fingers that were provided by the angled surfaces of keypad portion 12 of data entry terminal 10.

Figure 4:
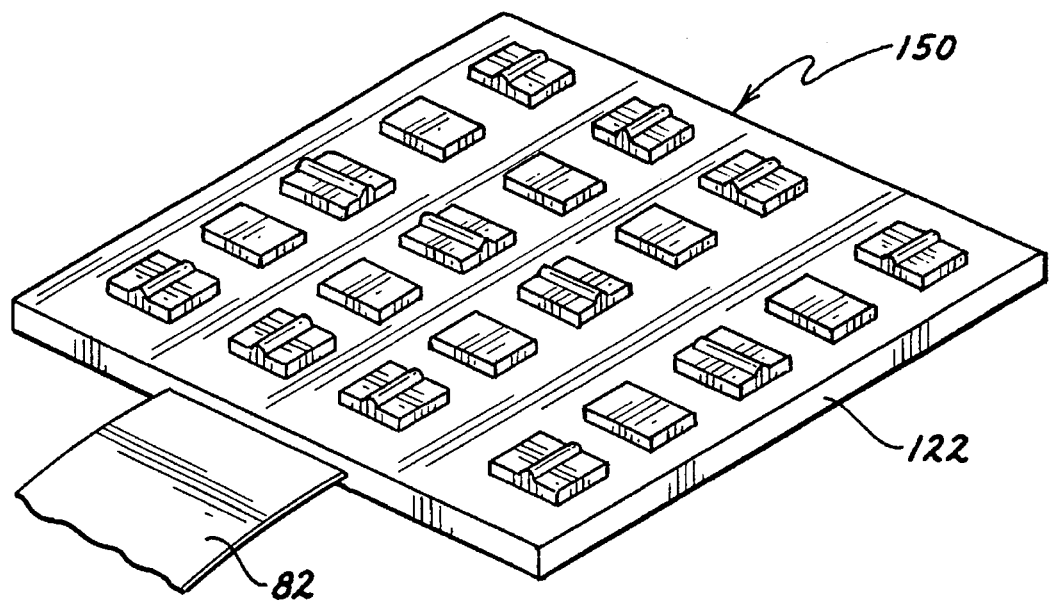
FIG. 4 is a perspective view of yet another alternate embodiment of the present invention.

Data entry terminal 100 also includes resting portion 42 the same as that of data entry terminal 10. Palm cushion assembly 46 may also be added to data entry terminal 100, relying on the retaining pins 44 of data entry terminal 10. Data entry terminal 150, illustrated in FIG. 4, is an alternate embodiment that incorporates keypad portion 122 of data entry terminal 100, but communicates with the data gathering device via a ribbon connector 82. Data entry terminal 150 may, however, be integrated directly into a data gathering device, such as the housing of a portable personal computer.

In use, data entry terminal 10 is preferably operated by the use of only the three middle fingers of either hand. With the palm of keyboard operator's hand resting on pad 52, the operator's fingers F move from key to key on keypad portion 12. In the case of right-handed usage, the operator's index finger presses the keys of column 20, the middle finger presses the keys of column 22, and the ring finger presses the keys of columns 24 and 26. Because of the angle of segments 14 and 16, the distance required for the fingers to travel between rows 28 and 36 is minimized, facilitating the ability of the operator to maintain the hand in a relatively fixed position without having to reach for the keys in the most distant rows. Similarly, with only four columns of keys, lateral movement is handled exclusively by the fingers, and the operator's hand may remain fixed in position on pad 52.

While the preferred embodiments of the invention have been described, it should be understood that various changes, adaptations and modifications may be made therein without departing from the spirit of the invention and the scope of the appended claims.

What is claimed is:

1. A data entry terminal operated by a single hand for entering data to be collected by a data collection device, comprising:

a keypad having a multiplicity of manually actuable keys, said keypad including an intermediate segment, a first angled segment projecting generally upwardly from and forming a first obtuse angle with said intermediate segment, and a second angled segment projecting generally upwardly from an opposing portion of said intermediate segment, said second angled segment forming a second obtuse angle with said intermediate segment; and means connected to said keypad for transmitting data collected by the data entry terminal to the data collection device.

2. The data entry terminal described in claim 1, further comprising:

at least four columns of said manually actuable keys generally vertically oriented on said keypad, at least one key of each said column being located on said intermediate segment, said first angled segment and said second angled segment.

3. The data entry terminal described in claim 1, further comprising:

a housing, said keypad being an integral, exposed portion thereof.

4. The data entry terminal described in claim 3, further comprising:

means for supporting the hand being used by the person entering data on the data entry terminal.

5. The data entry terminal described in claim 4, wherein said hand supporting means comprises:

a resting portion, integral with said housing.

6. The data entry terminal described in claim 5, wherein:

said resting portion extends generally rearwardly from said second angled segment of said keypad.

7. The data entry terminal described in claim 6, wherein said hand supporting means further comprises:

a palm cushion resting member attached to said housing and positioned above said resting portion, whereby the heel of the hand being used by the person entering data on the data entry terminal may be rested on said palm cushion resting member.

8. The data entry terminal described in claim 6, further comprising:

an instruction set attached to said housing, said instruction set illustrating the keystroke combinations used for entering characters and commands from said keypad.

9. The data entry terminal described in claim 8, wherein:

said instruction set is attached to said resting portion of said housing.

10. The data entry terminal described in claim 9, wherein said hand supporting means comprises:

a palm cushion resting member hingedly attached to said housing, whereby the heel of the hand being used by the person entering data on the data entry terminal may be rested on said palm cushion resting member, and said instruction set may be referenced by lifting said palm cushion resting member away from said housing.

11. The data entry terminal described in claim 10, further comprising:

means for biasing said palm cushion resting member to a position generally adjacent to said resting portion of said housing.

12. The data entry terminal described in claim 1, wherein said keypad further comprises:

first, second, third and fourth columns of said manually actuable keys.

13. A date entry terminal operated by single hand for entering data to be collected by a data collection device, comprising:

a keypad having a multiplicity of manually actuable keys, said keypad including an intermediate segment, a first angled segment projecting generally upwardly from and forming a first obtuse angle with said intermediate segment, and a second angled segment projecting generally upwardly from an opposing portion of said intermediate segment, said second angled segment forming a second obtuse angle with said intermediate segment;

means connected to said keypad for transmitting data collected by the data entry terminal to the data collection device;

at least one row of said manually actuable keys generally horizontally oriented on said first angled segment of said keypad;

at least one row of said manually actuable keys generally horizontally oriented on said intermediate segment of said keypad; and at least one row of said manually actuable keys generally horizontally oriented on said second angled segment of said keypad.

14. The data entry terminal described in claim 13, further comprising:

at least three rows of said manually actuable keys generally horizontally oriented on said intermediate segment of said keypad.

15. The data entry terminal described in claim 14, wherein:

said intermediate segment of said keypad includes a top row, a middle row, and a bottom row of said manually actuable keys.

16. The data entry terminal described in claim 15, further comprising:

means for tactily determining the location of the fingers of the person using the data entry terminal.

17. The data entry terminal described in claim 16, wherein said tactile finger location determination means comprises:

a raised ridge portion extending generally horizontally across and generally bisecting each said manually actuable key of said middle row of said intermediate segment of said keypad.

18. The data entry terminal described in claim 15, wherein:

each of said rows of said manually actuable keys on said first angled segment, said intermediate segment and said second angled segment of said keypad are generally parallel one to the next.

19. A data entry terminal operated by a single hand for entering data to be collected by a data collection device, comprising:

a keypad having a multiplicity of manually actuable keys, said keypad including an intermediate segment, a first angled segment projecting generally upwardly from and forming a first obtuse angle with said intermediate segment, and a second angled segment projecting generally upwardly from an opposing portion of said intermediate segment, said second angled segment forming a second obtuse angle with said intermediate segment;

means connected to said keypad for transmitting data collected by the data entry terminal to the data collection device;

first, second, third and fourth columns of said manually actuable keys; and said first and third columns of said manually actuable keys are generally equally spaced from said second column of said manually actuable keys, and said fourth column of said manually actuable keys is spaced from said third column a tactily distinguishable amount greater than said spacing between said second and third columns, respectively.

20. A data entry terminal operated by a single hand for entering data to be collected by a data collection device, comprising:

a keypad having a multiplicity of manually actuable keys;

means connected to said keypad for transmitting data collected by the data entry terminal to the data collection device;

first, second, third, fourth and fifth rows of said manually actuable keys generally horizontally oriented on said keypad;

at least four columns of said manually actuable keys generally vertically oriented on said keypad;

a housing, said keypad being an integral, exposed portion thereof;

means for supporting the hand being used by the person entering data on the data entry terminal; and a raised ridge portion for tactily determining the location of the fingers of the person using the data entry terminal, said raised ridge portion extending generally horizontally across and generally bisecting each said manually actuable key of said third row of said keypad.

21. The data entry terminal described in claim 20, wherein said hand supporting means comprises:

a resting portion, integral with said housing.

22. The data entry terminal described in claim 21, wherein:

said resting portion extends generally rearwardly from said keypad.

23. The data entry terminal described in claim 22, wherein said hand supporting means further comprises:

a palm cushion resting member attached to said housing and positioned above said resting portion, whereby the heel of the hand being used by the person entering data on the data entry terminal may be rested on said palm cushion resting member.

24. The data entry terminal described in claim 22, further comprising:

an instruction set attached to said housing, said instruction set illustrating the keystroke combinations used for entering characters and commands from said keypad.

25. The data entry terminal described in claim 24, wherein:

said instruction set is attached to said resting portion of said housing.

26. The data entry terminal described in claim 25, wherein said hand supporting means further comprises:

a palm cushion resting member hingedly attached to said housing, whereby the heel of the hand being used by the person entering data on the data entry terminal may be rested on said palm cushion resting member, and said instruction set may be referenced by lifting said palm cushion resting member away from said housing.

27. The data entry terminal described in claim 26, further comprising:

means for biasing said palm cushion resting member to a position generally adjacent to said resting portion of said housing.

28. The data entry terminal described in claim 20, wherein:

said keypad includes first, second, third and fourth columns of said manually actuable keys.

29. The data entry terminal described in claim 28, wherein:

said first and third columns of said manually actuable keys are generally equally spaced from said second column of said manually actuable keys, and said fourth column of said manually actuable keys is spaced from said third column a tactily distinguishable amount greater than said spacing between said second and third columns, respectively.

30. The data entry terminal described in claim 20, further comprising:

second means for tactily determining the location of the fingers of the person using the date entry terminal.

31. The data entry terminal described in claim 30, wherein said second tactile finger location determination means comprises:

a raised ridge portion extending generally vertically across and generally bisecting each said manually actuable key of said first and fifth rows of said keypad.

32. A data entry terminal operated by a single hand for entering data to be collected by a data collection device, comprising:

a keypad having a multiplicity of manually actuable keys, said keypad including an intermediate segment, a first angled segment projecting generally upwardly from and forming a first obtuse angle with said intermediate segment, and a second angled segment projecting generally upwardly from an opposing portion of said intermediate segment, said second angled segment forming a second obtuse angle with said intermediate segment;

means connected to said keypad for transmitting data collected by the data entry terminal to the data collection device;

at least four columns of said manually actuable keys generally vertically oriented on said keypad, at least one key of each said column being located on said intermediate segment, said first angled segment and said second angled segment; and at least three keys of each said column being located on said intermediate segment.

33. A data entry terminal operated by a single hand for entering data to be collected by a data collection device, comprising:

a keypad having a multiplicity of manually actuable, single-action keys, said keypad including an intermediate segment, a first angled segment projecting generally upwardly from and forming a first obtuse angle with said intermediate segment, and a second angled segment projecting generally upwardly from an opposing portion of said intermediate segment, said second angled segment forming a second obtuse angle with said intermediate segment; and means connected to said keypad for transmitting data collected by the data entry terminal to the data collection device.

34. A method for operating a data entry terminal configured for one-handed operation, including a housing having a keypad, the keypad having an intermediate segment, a first angled segment projecting generally upwardly from and forming a first obtuse angle with the intermediate segment, and a second angled segment projecting generally upwardly from an opposing portion of the intermediate segment, the second angled segment forming a second obtuse angle with the intermediate segment, four columns and five rows of manually actuated keys, the first column of keys being the leftmost column and the fourth column of keys being the rightmost column, the first row of keys being positioned on the first angled segment, the fifth row of keys being positioned on the second angled segment, and the three middle rows of keys being positioned on the intermediate segment of the keypad, and a hand supporting portion, comprising the steps of:

resting the heel of the hand being used by the person entering data on the data entry terminal on the hand supporting portion of the housing;

positioning the three middle fingers of the hand being used for data entry generally above the keypad;

determining the position of the fingers relative to the manually actuable keys of the keypad by locating the angled keys positioned on the first and second angled segments; and depressing two keys sequentially for each alphanumeric character and program function desired to be entered by the person entering data on the data entry terminal.

35. The one-handed method of entering data on a data entry terminal as described in claim 34, wherein operation by the right hand of the person entering data on the data entry terminal comprises the further steps of:

depressing the keys of the first column, as needed, with the index finger of the right hand;

depressing the keys of the second column, as needed, with the middle finger of the right hand; and depressing the keys of the third and fourth columns, as needed, with the ring finger of the right hand.

36. The one-handed method of entering data on a data entry terminal as described in claim 34, wherein operation by the left hand of the person entering data on the data entry terminal comprises the further steps of:

depressing the keys of the third and fourth columns, as needed, with the index finger of the left hand;

depressing the keys of the second column, as needed, with the middle finger of the left hand; and depressing the keys of the first column, as needed, with the ring finger of the left hand.

37. The one-handed operation of entering data on a data entry terminal as described in claim 34, comprising the further step of:

resting the data entry terminal on an object with a flat support surface.

* * * * *